(12) United States Patent
Fischer et al.

(10) Patent No.: US 12,529,461 B2
(45) Date of Patent: Jan. 20, 2026

(54) METHOD FOR PRODUCING AN OPTICAL COMPONENT AND AN OPTICAL COMPONENT

(71) Applicant: HELLA GmbH & Co. KGaA, Lippstadt (DE)

(72) Inventors: Bernd Fischer, Altenbeken (DE); Ralf Rochotzki, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 980 days.

(21) Appl. No.: 17/410,599

(22) Filed: Aug. 24, 2021

(65) Prior Publication Data
US 2022/0057064 A1  Feb. 24, 2022

(30) Foreign Application Priority Data
Aug. 24, 2020  (DE) ............... 10 2020 122 047.2

(51) Int. Cl.
| | |
|---|---|
| *G02B 1/10* | (2015.01) |
| *B29D 11/00* | (2006.01) |
| *C23C 14/02* | (2006.01) |
| *C23C 14/04* | (2006.01) |
| *C23C 14/14* | (2006.01) |
| *F21S 41/37* | (2018.01) |

(52) U.S. Cl.
CPC ........ *F21S 41/37* (2018.01); *B29D 11/00865* (2013.01); *C23C 14/027* (2013.01); *C23C 14/042* (2013.01); *C23C 14/14* (2013.01); *G02B 1/10* (2013.01)

(58) Field of Classification Search
CPC .. F21S 41/37; B29D 11/00865; C23C 14/027; C23C 14/042; C23C 14/14; G02B 1/10
See application file for complete search history.

(56) References Cited

U.S. PATENT DOCUMENTS 6,441,943 B1 * 8/2002 Roberts ................. G02F 1/157
                                                      359/522
6,520,650 B2   2/2003 Fraizer
(Continued)

FOREIGN PATENT DOCUMENTS

| CN | 1594644 A | 3/2005 |
|---|---|---|
| CN | 111465803 A | 7/2020 |

(Continued)

OTHER PUBLICATIONS

Hardy, Norm, What is Reactive Sputtering, What is Reactive Sputtering?—Semicore Equipment Inc., Published Jun. 20, 2013, Retrieved Nov. 23, 2024 (Year: 2013).*

*Primary Examiner* — Michael B Cleveland
(74) *Attorney, Agent, or Firm* — Muncy, Geissler, Olds & Lowe, P.C.

(57) ABSTRACT

A method for producing an optical component of a lighting device for vehicles, wherein a base body is made of a translucent or transparent material, a screen coating is applied to an outer surface of the base body by vapor deposition or by sputtering of a coating material, wherein the screen coating is applied as a reflective coating, wherein, during the application process, first a first reflective laminate layer with a low degree of reflection and then a second reflective laminate layer with a high degree of reflection are applied.

7 Claims, 1 Drawing Sheet

(56) References Cited

U.S. PATENT DOCUMENTS

| | | | | |
|---|---|---|---|---|
| 2003/0103257 A1* | 6/2003 | Forgette | ............... | B60R 1/1207 |
| | | | | 359/265 |
| 2006/0061008 A1* | 3/2006 | Karner | .................. | G09G 5/026 |
| | | | | 264/250 |
| 2008/0212189 A1* | 9/2008 | Baur | ...................... | B60R 1/088 |
| | | | | 362/540 |

FOREIGN PATENT DOCUMENTS

| | | | | |
|---|---|---|---|---|
| DE | 10005121 A1 | 10/2000 | | |
| DE | 10029905 A1 | 1/2002 | | |
| DE | 102004049389 A1 | 4/2006 | | |
| DE | 102009051272 A1 | 5/2011 | | |
| DE | 102018127610 A1 | 5/2020 | | |
| DE | 102018131027 A1 | 6/2020 | | |
| WO | WO-2020130981 A2 * | 6/2020 | ............. | C03C 17/36 |

* cited by examiner

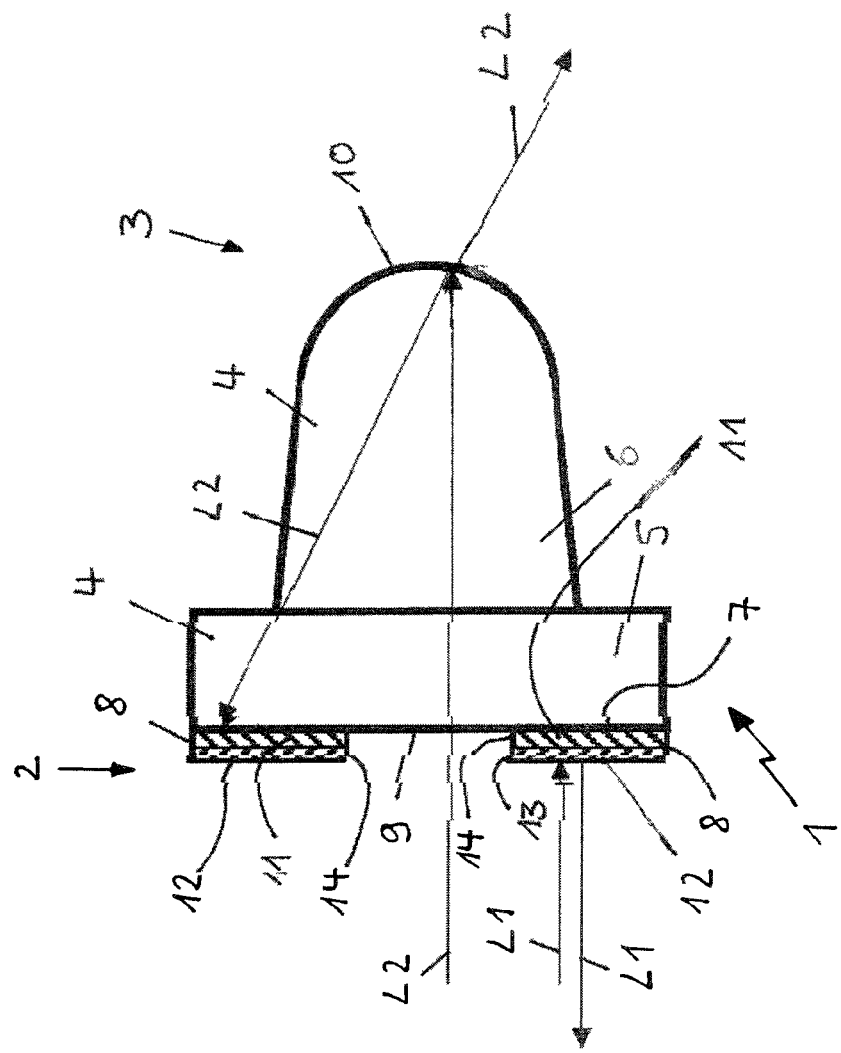

METHOD FOR PRODUCING AN OPTICAL COMPONENT AND AN OPTICAL COMPONENT

This nonprovisional application claims priority under 35 U.S.C. § 119(a) to German Patent Application No. 10 2020 122 047.2, which was filed in Germany on Aug. 24, 2020, and which is herein incorporated by reference.

BACKGROUND OF THE INVENTION

Field of the Invention

The present invention relates to a method for producing an optical component of a lighting device for vehicles, wherein a base body is made of a translucent or transparent material, and a screen coating is applied to an outer surface of the base body by vapor deposition or by sputtering of a coating material. The invention relates further to an optical component for a lighting device for vehicles with a base body made of a translucent or transparent material, with a screen coating on an outer surface of the base body, wherein the screen coating is applied to the outer surface of the base body by vapor deposition or by sputtering of a coating material.

Description of the Background Art

Methods for producing an optical component of a lighting device for vehicles, in which a coating is applied to a base body by vapor deposition or sputtering or painting, are known from DE 10 2009 051 272 A1 and DE 10 2018 127 610 A1, which are incorporated herein by reference.

A method for producing an optical component of a lighting device for vehicles, in which a screen coating is applied to a base body of the optical component by vapor deposition, sputtering, or painting, is known from DE 10 2018 131 027 A1, which is incorporated herein by reference. The screen coating is disposed on a light entry side of the optical component to which a light source is assigned. The screen coating has a screen edge, so that the screen edge can be imaged by means of the optical component to form a cut-off line of a predetermined light distribution. The known method enables a compact lighting device.

SUMMARY OF THE INVENTION

It is therefore an object of the present invention to provide a method for producing an optical component of a lighting device for vehicles and an optical component such that the light output is further improved.

To achieve said object, the method of the invention is characterized in that the screen coating is applied as a reflective coating, wherein, during the application process, first a first reflective laminate layer with a low degree of reflection and then a second reflective laminate layer with a high degree of reflection are applied.

According to an exemplary embodiment of the invention, during an application process, first a first reflective laminate layer with a lower degree of reflection and then a second reflective laminate layer with a high degree of reflection are applied. In this way, a two-layer coating can advantageously be applied in a simple manner, wherein an inner first reflective coating reduces the occurrence of undesired stray light and an outer second reflective coating leads to a reduction in the heat input into the optical component. With the application of a single thin reflective coating, different photometric functions can thus be implemented more or less at the same time.

According to a refinement of the invention, the reflective coating is partially removed by laser ablation, so that a light entry surface is exposed on the outer surface of the optical component. The light emitted by a light source can thus enter the optical component exclusively via the light entry surface, whereas the adjacent second reflective laminate layer reflects the light striking it. In this way, a fixed, predetermined dimension of the light entry surface can advantageously be set.

According to a refinement of the invention, a metallic coating material to which auxiliary gases of different concentration are added during the application is applied to the outer surface of the optical component, so that an intermetallic phase is applied to the outer surface. The reflective metallic component of the intermetallic phase depends on the concentration of the auxiliary gas during the application. In a first phase of the application, the amount of auxiliary gases is relatively high, so that the first reflective laminate layer applied first has a relatively low metallic content, whereas in a second phase the content of auxiliary gases is relatively low, so that the second reflective laminate layer applied thereafter has a relatively high metallic content. The degree of reflection in the first reflective laminate layer can be in the range from 30% to 35%, whereas the degree of reflection in the second reflective laminate layer is in the range from 55% to 65%.

According to a refinement of the invention, the intermetallic phase has chromium as a metallic coating material, on the one hand, and nitrides or oxides as a nonmetallic coating material, on the other hand. The degree of reflection of the first reflective laminate layer and the second reflective laminate layer can be adjusted as a function of the amounts of these coating materials.

To achieve the object, the invention is also characterized in that the screen coating is formed as a reflective coating which comprises a first reflective laminate layer with a low degree of reflection and a second reflective laminate layer with a high degree of reflection, wherein the first reflective laminate layer is disposed between the outer surface of the base body and the second reflective laminate layer.

The optical component of the invention has a reflective coating with a first reflective laminate layer of a lower degree of reflection and with a second reflective laminate layer of a high degree of reflection, wherein the first reflective laminate layer is disposed on a side facing the outer surface of the optical component and the second reflective laminate layer is disposed on a side of the reflective coating facing away from the optical component. The two-layer nature of the reflective coating results in a double function of the reflective coating. On the inner side, the first reflective laminate layer reduces the unwanted scattered light occurring within the optical component, whereas the outer second reflective laminate layer reflects part of the incident light and thus the heat input into the optical component is reduced. Overall, the reflective coating serves as a screen because no light can pass through.

According to a refinement of the invention, the optical component is formed as a primary optical component with a light entry side on which the reflective coating is provided and with a light exit side where the light is coupled out. The primary optical component is preferably formed as a lens which parallelizes the light emitted by the light source located in the vicinity of the light entry side and allows it to pass to a further optical component. The reflective coating advantageously enables the effect of a screen, the positioning of which can be adjusted relatively precisely relative to the optical component. The relatively thin screen is, as it were, part of the optical component. The light source can be located at a distance of less than or equal to 2 mm.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a side view of an optical component.

DETAILED DESCRIPTION

A lighting device of the invention for vehicles is preferably formed as a headlight which has a light source unit and an optical unit for generating a predetermined light distribution, for example, a low beam distribution, a glare-free high beam distribution, etc. The optical unit can have at least one lens element as an optical component and/or a surface modulation device (DMD element (digital micromirror device), LCD element (liquid crystal display)).

In the present exemplary embodiment, the lighting device has a light source device with a number of light sources, each of which is assigned an optical component 1, shown in the FIGURE, as a primary optical component. Primary optical component 1 is formed substantially flat on a light entry side 2, facing the light source, and is formed convex-shaped on a light exit side 3, facing away from the light source. The light source is disposed at a distance of a maximum of 2 mm from the primary optical component.

The optical component 1 has a base body 4 which is formed of a translucent or transparent material, preferably glass or plastic (PMA, PC).

In the present exemplary embodiment, base body 4 includes a cylindrical section 5, which is disposed facing the light source, and a lens-shaped section 6, which is disposed on a side, facing away from the light source, of base body 4. Base body 4 is formed in one piece and is preferably produced by injection molding. An outer surface 7, facing the light source, of base body 4 is formed flat. It forms an end face of cylindrical section 5 of base body 4.

Arranged on outer surface 7 of cylindrical section 5 of base body 4 is a screen coating in the form of a reflective coating 8, which delimits a central light entry surface 9 on cylindrical section 5 of base body 4. Reflective coating 8 has the effect that a light beam L1 striking it is reflected and cannot enter base body 4. Only a light beam L2 striking light entry surface 9 is coupled into base body 4 and emerges again from base body 4, for example, on light exit surface 10 disposed on light exit side 3.

Reflective coating 8 has a first reflective laminate layer 11 with a low degree of reflection, wherein first reflective laminate layer 11 is disposed on a side facing outer surface 7 of base body 4. In this case, first reflective laminate layer 11 adhesively abuts outer surface 7 of base body 4. Further, reflective coating 8 comprises a second reflective laminate layer 12 with a high degree of reflection, which is disposed on a side of reflective coating 8, said side facing away from outer surface 7, therefore, on a side facing the light source. First reflective laminate layer 11 is located between second reflective laminate layer 12 and outer surface 7. Second reflective laminate layer 12 thus forms an outer side of reflective coating 8.

Reflective coating 8 is applied to outer surface 7 of base body 4 by vapor deposition or by sputtering of a coating material or an intermetallic phase. Added to the preferably metallic coating material, which can be formed, for example, as chromium (Cr), during the application process is an auxiliary gas with such a concentration that an intermetallic phase is applied with a different degree of reflection. Depending on the concentration of the auxiliary gas, the composition of the intermetallic phase, formed of the metallic coating material and the nonmetallic coating material, changes.

According to a first embodiment of the invention, the amount of auxiliary gas can be high in a first time period of the application process, so that the applied coating material has a relatively low metallic coating material content and a relatively high nonmetallic coating material content. In this way, first reflective laminate layer 11 is produced with a low degree of reflection. If the metallic coating material is chromium and the nonmetallic coating material is nitride or oxide, the degree of reflection can be, for example, in the range from 30% to 35% by means of the auxiliary gas which forms the nonmetallic coating material. In a second time period of the application process, the amount of the auxiliary gas or the nonmetallic coating material amount is reduced stepwise or continuously, so that the amount of the metallic coating material in the intermetallic phase is higher than in the first time period. The reduction in the concentration of the auxiliary gas in the second period can be selected such that second reflective laminate layer 12 is produced in the second time period with a degree of reflection in the range from 55% to 65%. The degree of reflection of the respective laminate layers 11, 12 can thus be set as a function of the concentration or amount of the auxiliary gas in the intermetallic phase.

Alternatively, another metal, for example, stainless steel, can be used as the metallic coating material, wherein accordingly the metal oxide or metal nitride is used as the nonmetallic coating material.

In a final processing step, reflective coating 8 can then be partially removed by laser ablation in order to form light entry surface 9. Alternatively, reflective coating 8 can also be applied by masking of the outer surface 7, so that a subsequent laser ablation is not necessary.

As can be seen from the FIGURE, reflective coating 8 covers more than half of outer surface 7 of base body 4, said surface disposed on light entry side 2. Peripheral edges 13, 14 of first reflective laminate layer 11 and second reflective laminate layer 12 are arranged flush with one another, so that a sharp screen edge is formed.

The degree of reflection of second reflective laminate layer 12 is greater than the degree of reflection of first reflective laminate layer 11. The degree of reflection of second reflective laminate layer 12 is preferably greater than 50% and the degree of reflection of first reflective laminate layer 11 is less than 50%.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing an optical component of a lighting device for vehicles, the method comprising:
   providing a base body of a translucent or transparent material; and
   applying a screen coating to an outer surface of the base body by vapor deposition or by sputtering of a coating material, such that a first portion of the outer surface has the screen coating and a second portion of the outer surface is devoid of the screen coating,
   wherein the screen coating is applied as a reflective coating, such that light emitted by a light source of the lighting device, in a direction towards the outer surface of the base body, is reflected by the first portion of the outer surface having the reflective coating and enters the base body exclusively via the second portion of the outer surface that is devoid of the screen coating, the second portion of the outer surface thus forming a light entry surface,
   wherein, during the application process, first a first reflective laminate layer with a low degree of reflection and then a second reflective laminate layer with a high degree of reflection are applied, such that the first reflective laminate layer is disposed between the outer surface of the base body and the second reflective laminate layer.

2. The method according to claim 1, wherein a concentration of a nonmetallic coating material is added to a metallic coating material to form an intermetallic phase that is applied to the outer surface of the base body during the application process, wherein the nonmetallic coating material is an auxiliary gas, wherein the intermetallic phase that is applied to the outer surface of the base body forms the first reflective laminate layer and the second reflective laminate layer, and wherein the degree of reflection of the first reflective laminate layer and the second reflective laminate layer is set as a function of an amount of the auxiliary gas added to the metallic coating material.

3. The method according to claim 2, wherein a volume fraction and/or weight fraction of the auxiliary gas added to the metallic coating material decreases stepwise or continuously from the beginning of the application process to the end of the application process.

4. The method according to claim 2, wherein chromium-is the metallic coating material is chromium and the nonmetallic coating material is nitrides or oxides.

5. The method according to claim 1, wherein the first reflective laminate layer and the second reflective laminate layer, that are provided on the outer surface of the base body, are partially removed by laser ablation to form the second portion of the outer surface of the base body that is the light entry surface.

6. The method according to claim 1, wherein the reflective coating is applied to the outer surface of the base body after placing a mask on the outer surface of the base body, such that when the mask is removed, the second portion of the outer surface of the base body, that forms the light entry surface, is provided.

7. The method according to claim 1, wherein the reflective coating is formed such that none of the light emitted by the light source of the lighting device passes through the reflective coating.

* * * * *